(12) United States Patent
Hsu (10) Patent No.: US 10,394,709 B2
(45) Date of Patent: Aug. 27, 2019

(54) FUNCTION ANALYSIS METHOD AND MEMORY DEVICE

(71) Applicant: Silicon Motion, Inc., Jhubei (TW)

(72) Inventor: Kuo-Chiang Hsu, Hsinchu (TW)

(73) Assignee: Silicon Motion, Inc., Jhubei (TW)

( * ) Notice: Subject to any disclaimer, the term of this patent is extended or adjusted under 35 U.S.C. 154(b) by 385 days.

(21) Appl. No.: 15/343,515

(22) Filed: Nov. 4, 2016

(65) Prior Publication Data

US 2017/0262366 A1   Sep. 14, 2017

(30) Foreign Application Priority Data

Mar. 8, 2016 (TW) .............................. 105106995 A (51) Int. Cl.
*G06F 8/75* (2018.01)
*G06F 12/06* (2006.01)
*G06F 16/00* (2019.01)
*G06F 8/41* (2018.01)

(52) U.S. Cl.
CPC ............ *G06F 12/0615* (2013.01); *G06F 8/75* (2013.01); *G06F 16/00* (2019.01); *G06F 8/41* (2013.01); *G06F 2212/1008* (2013.01)

(58) Field of Classification Search
CPC ................................................. G06F 8/00–78
See application file for complete search history.

(56) References Cited

U.S. PATENT DOCUMENTS

| 5,845,127 | A | * | 12/1998 | Isozaki | G06F 8/443 717/144 |
| 8,635,204 | B1 | * | 1/2014 | Xie | G06F 8/74 707/709 |
| 2011/0029551 | A1 | | 2/2011 | Chen et al. | |
| 2013/0283250 | A1 | * | 10/2013 | Eichenberger | G06F 8/43 717/144 |

FOREIGN PATENT DOCUMENTS

TW   200903251 A   1/2009

OTHER PUBLICATIONS

Office Action of corresponding TW application, published on Oct. 28, 2016.

* cited by examiner

*Primary Examiner* — Nicholas J Simonetti
(74) *Attorney, Agent, or Firm* — Wang Law Firm, Inc.

(57) ABSTRACT

A function analysis method applied to a memory device includes analyzing the mapping relationship between at least one API function and at least one normal function, analyzing a calling relationship between the at least one normal function through the correspondence relationship, and developing a two-dimensional array to analyze whether there is a loop in the calling relationship or not. When one of the at least one normal function calls another normal function, whether or not the name of the called normal function is the same as the name of the normal function and names of the normal functions which call the normal function is checked.

13 Claims, 7 Drawing Sheets

FIG. 1

Normal Function Database

| index | name | calling | called | alter... | option |
|---|---|---|---|---|---|
| 122 | ISP_NF_FTL_Cleanpart2n3 | 3 | 6 | 1 | 0 |
| 123 | ISP_NF_FTL_Erase_Trim | 0 | 9 | 1 | 1 |
| 124 | ISP_NF_FTL_Erase_Trim_ModeEntry | 1 | 7 | 0 | 1 |
| 125 | ISP_NF_FTL_LoadBadBit_BuildList | 1 | 2 | 0 | 0 |
| 126 | ISP_NF_FTL_LoadDiffBlock_BuildList | 1 | 2 | 0 | 0 |

Mapping Relationship Database

| index | name | f-index |
|---|---|---|
| 0 | API_NF_FTL_ReportExe | 128 |
| 1 | API_NF_FTL_ReportExe | 130 |
| 2 | API_NF_FTL_ReportExe | 129 |
| 3 | API_NF_FTL_ReportExe | 139 |
| 4 | API_NF_PFTL_Read_SysPage_Retry | 210 |

API function database

| index | name | option |
|---|---|---|
| 0 | API_CTL_ErrHandle | 0 |
| 1 | API_CTL_FuncSel | 0 |
| 2 | API_CTL_GetRegister | 0 |
| 3 | API_CTL_SWAP_FuncSel | 0 |
| 4 | API_CTL_SetRegister | 0 |

Calling Relationship Database

| index | calling | called |
|---|---|---|
| 0 | 138 | 113 |
| 1 | 138 | 110 |
| 2 | 105 | 103 |
| 3 | 629 | 979 |
| 4 | 629 | 105 |
| 5 | 629 | 93 |
| 6 | 629 | 91 |
| 7 | 629 | 92 |
| 8 | 112 | 629 |
| 9 | 114 | 234 |
| 10 | 114 | 219 |
| 11 | 146 | 162 |
| 12 | 146 | 979 |
| 13 | 145 | 162 |
| 14 | 145 | 339 |
| 15 | 145 | 1002 |
| 16 | 145 | 979 |
| 17 | 145 | 3 |
| 18 | 145 | 103 |
| 19 | 147 | 162 |

FUNCTION ANALYSIS METHOD AND MEMORY DEVICE

CROSS REFERENCE TO RELATED APPLICATIONS

This Application claims priority of Taiwan Patent Application No. 105106995 filed on Mar. 8, 2016, the entirety of which is incorporated by reference herein.

BACKGROUND OF THE INVENTION

Field of the Invention

The disclosure generally relates to a function management method and a memory device, and more particularly, to a function management method and a memory device which could analyze the mapping relationship between normal functions and API functions, analyze the calling relationship between normal functions, and inspect whether there is a loop or not.

Description of the Related Art

Many internal stored programs (ISPs) are generally stored in memory devices. ISPs for different functional modules are usually stored in a memory. When a functional module is utilized by a user, the program codes of the ISP of the functional module will be loaded to the memory in order to execute the loaded program codes and assign the normal function which is mapped to the application programming interface (API) function. However, the storage capacity of the memory is limited. When there is a loop in the calling relationship of the normal functions, the access time and performance of the memory device will be affected.

However, it spends much time to search the word string of the functions of the previous level. In addition, regarding current function management methods, loops cannot be found by analyzing the calling relationship between normal functions of the ISP and by directly utilizing the API function. Therefore, a function management method is needed that can analyze the mapping relationship between normal functions and API functions and the calling relationship between normal functions, in order to discover loops and improve the performance of the memory device.

BRIEF SUMMARY OF THE INVENTION

In order to solve the aforementioned problem, a memory device and its function management method are provided by the present invention to record the mapping relationship of normal functions and API functions, and to analyze the calling relationship of normal functions to inspect the loop. Therefore, the performance of the memory device can be improved. In addition, a two-dimensional array is utilized by the function management of the present invention to simulate the calling of the normal functions and tree-type search. Accordingly, users and research developers can rapidly and efficiently discover a loop in the calling relationship and prevent the loop from affecting the performance.

In one aspect of the invention, a function analysis method for a memory device is provided. The function analysis method includes analyzing the mapping relationship of at least one application programming interface (API) function and at least one normal function, analyzing the calling relationship of the normal function through the mapping relationship, and developing a two-dimensional array to analyze whether there is loop or not in the calling relationship. When one normal function of the at least one normal function calls another normal function of the at least one normal function, name of the called normal function is inspected to determine whether or not it is identical to name of the normal function and identical to names of all normal functions which call the normal function. In the step of developing a two-dimensional array to analyze whether there is a loop or not in the calling relationship, when the name of the called normal function is identical to name of the normal function, or identical to names of all normal functions which call the normal function, it is determined that there is a loop in the calling relationship.

Furthermore, a first dimensional array of the two-dimensional array is utilized to record the normal function and the called normal function which have the calling relationship, and a second dimensional array of the two-dimensional array is utilized to record all normal functions which can be called by the normal function, and record all normal functions which can be called by the called normal function respectively. In addition, the two-dimensional array further records the quantity of all normal functions which can be called by the normal function and the called normal function, and records an ordinal number of the called normal function among all normal functions which can be called by the normal function.

In the step of analyzing the mapping relationship of at least one API function and at least one normal function, when any one of the at least one API function is mapped to the at least one normal function, the function analysis method obtains the normal function and the API function which have the mapping relationship from the normal function database and the API function database, marks that the normal function is mapped to the API function in the normal function database, and records the mapping relationship of the normal function and the API function in a mapping relationship database. In the step of analyzing the calling relationship of the at least one normal function, when a function which is called by the normal function is a normal function, the function analysis method records the calling relationship of the normal function and the called normal function in a calling relationship database. In the step of analyzing the calling relationship of the at least one normal function, when a function which is called by the normal function is an API function, the function analysis method obtains the normal function which is mapped to the called API function, and records the calling relationship of the normal function and another normal function which is mapped to the API function in the calling relationship database.

In another aspect of the invention, a memory device with function analysis is provided. The memory device includes a parsing module, an array module and an analysis module. The parsing module analyzes the mapping relationship of at least one application programming interface (API) function and at least one normal function, and analyzes the calling relationship of the at least one normal function through the mapping relationship. The array module develops a two-dimensional array to record the calling relationship. The analysis module analyzes whether there is a loop or not in the calling relationship. When one normal function of the at least one normal function calls another normal function of the at least one normal function, name of the called normal function is inspected to determine whether or not it is identical to name of the normal function and identical to names of all normal functions which call the normal function.

Other aspects and features of the present invention will become apparent to those with ordinarily skill in the art upon review of the following descriptions of specific embodiments of the function management method.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 1:
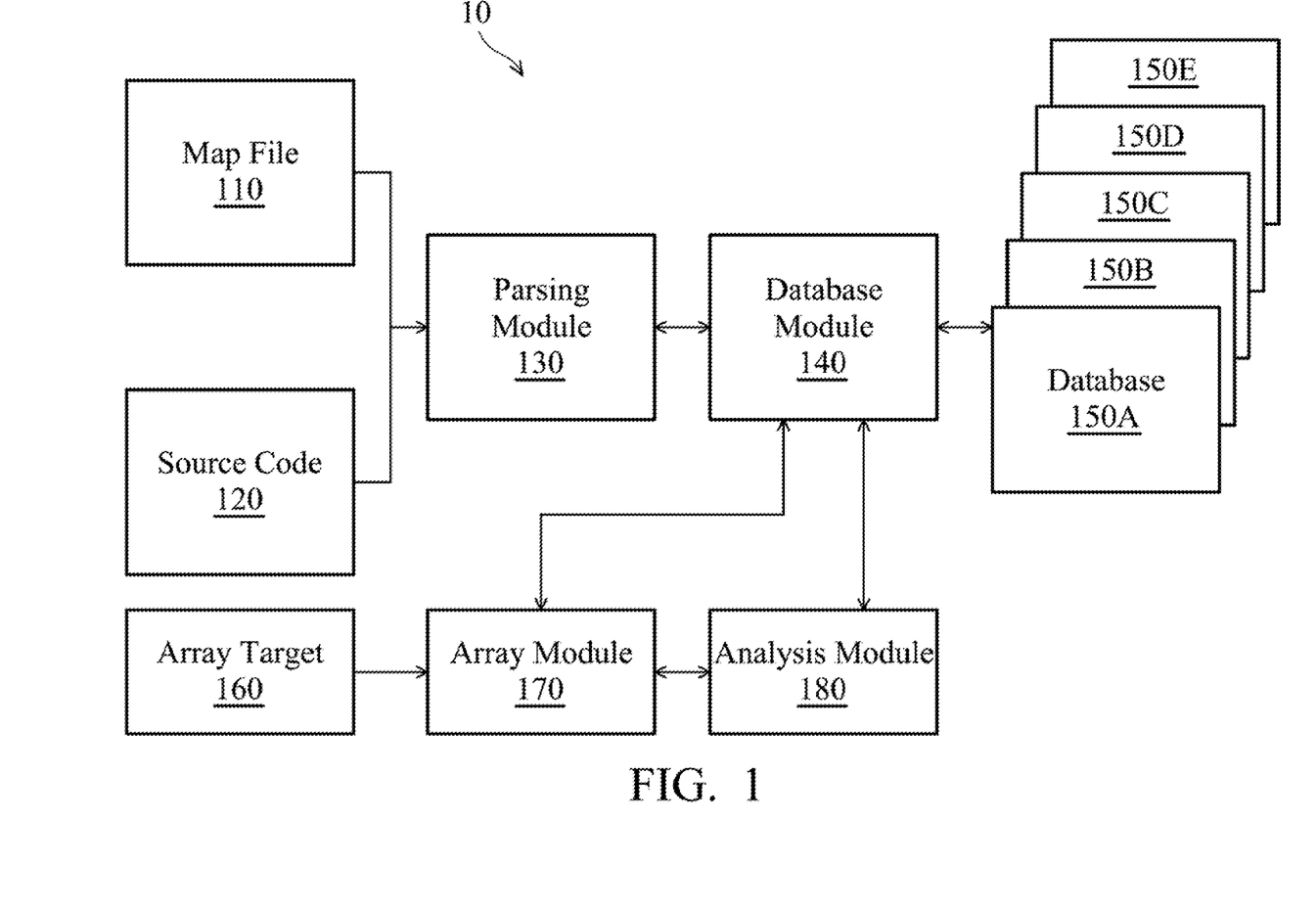
FIG. 1 is a schematic diagram of a memory device according to an embodiment of the invention.

FIG. 1 is a schematic diagram of a memory device 10 according to an embodiment of the invention. The memory device 10 could be random access memory (RAM), read only memory (ROM), a flash, a hard disk, a soft disk or a magnetic memory. As shown in FIG. 1, the memory device 10 includes a map file 110, source code 120, a parsing module 130, a database module 140, a plurality of databases 150A-150E, an array target 160, an array module 170 and an analysis module 180. The parsing module 130 and the database module 140 could be implemented by circuit, hardware or embedded software codes. The embedded software codes could be accessed and executed by a processor. In addition, the memory device 10 could be arranged in an electronic device. For example, the electronic device could be a mobile electronic device, a tablet computer, a laptop computer or a PDA, or could it be an electronic device such as a desktop computer or a server. Therefore, the memory device 10 could be utilized to record functions and their source codes, which are necessary for all kinds of applications of the electronic device.

In one embodiment, the map file 110 is generated from a compiler. The parsing module 130 receives a plurality of functions through the map file 110, and parses at least one source code 120 of the memory device 10 through the map file 110. Furthermore, the above functions include at least one normal function and at least one application programming interface (API) function. Specifically, an API function is utilized for interleaving and communication, and it does not interrupt execution of the source code 120. The advantages of the API function include the program developer being able to replace the source code 120 of the bottom layer using routine functions. The development could be facilitated accordingly. Unlike the API function, the normal function is a real function. An API function could map one or more API functions. Therefore, the mapping relationships between the normal functions and the API functions are recorded and analyzed to enhance the development and improve the performance of the memory device 10.

It should be noted that the map file 110 includes the names of at least one API function and at least one normal function. In one embodiment, the API functions and the normal functions can be distinguished by their names. For example, if the starting part of the name of a function is API, it can be identified as an API function. If the starting part of the name of a function is not API, it can be identified as a normal function. Therefore, by utilizing the map file 110, the parsing module 130 can parse the API function and the normal function which are used by the memory device 10. In one embodiment, it is not necessary to analyze the function which will not actually be utilized. As such, the analytical efficiency of the parsing module 130 could be increased.

Figure 2:
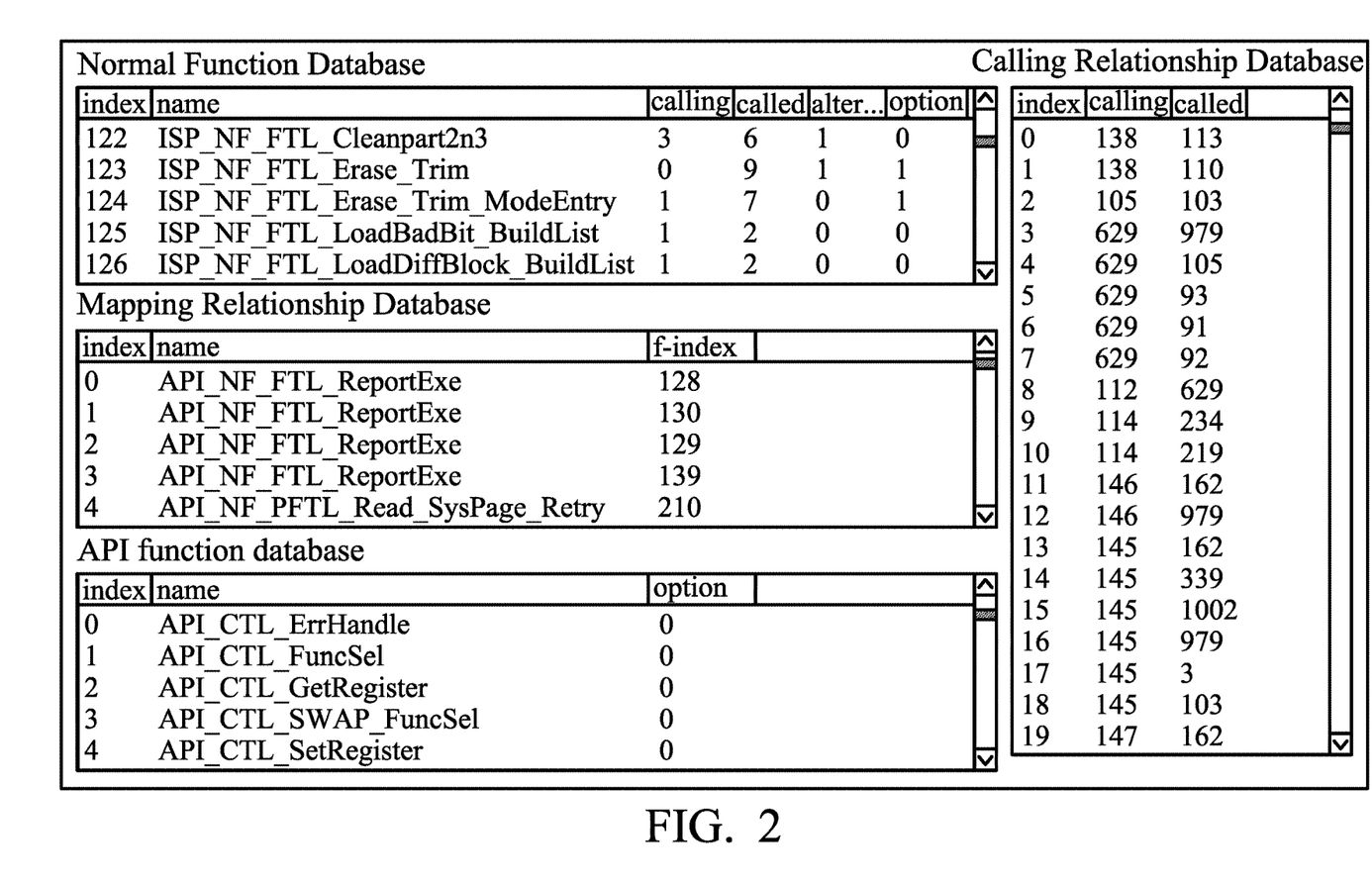
FIG. 2 is a schematic diagram of a number of databases according to an embodiment of the invention.

In addition, by utilizing the map file 110, the database module 140 develops at least one normal function database (database 150A) for normal functions and at least one API function database (database 150B) for API functions. FIG. 2 is a schematic diagram of a number of databases 150A-150D according to an embodiment of the invention. As shown in FIG. 2, the normal function database 150A records the indexes of normal functions (the index column), the names of the normal functions (the name column), the quantity of functions which are called by the normal function (the calling column), the quantity of functions which call the normal function (the called column) and/or whether the normal function corresponds to the API function or not (the alternative column). In addition, the API function database 150B records the names of the API functions (the name column).

In the normal function database shown in FIG. 2, each normal function has an index number. For example, the name of the function with index number 122 is ISP_NF_FTL_CleanPart2n3. The function calls three normal functions (the calling column is 3), it is called by six normal functions (the called column is 6), and it has a corresponding API function (the alternative column is 1). Furthermore, the name of the function with index number 124 is ISP_NF_FTL_Erase_Trim_ModeEntry. The function calls one normal function (the calling column is 1), it is called by seven normal functions (the called column is 7), and it does not have a corresponding API function (the alternative column is 0). In addition, the API function database of FIG. 2 records the names of the API functions (the name column). For example, the name of the function with index number 0 is API_CTL_ErrHandle, and the name of the function with index number 1 is API_CTL_FuncSel.

In one embodiment, the first parsing is executed by the parsing module 130 to clarify the mapping relationship between normal functions and API functions. A mapping relationship database (database 150C) between at least one API function and at least one normal function is developed by the database module 140. In the mapping relationship database of FIG. 2, the name of the API function (the name column) and at least one corresponding normal function (F-index column) are recorded. Each index number represents a mapping relationship. For example, the mapping between the API function with the name of API_NF_FTL_ReportExe and the normal function with number 128 is recorded in the column of index number 0, and the mapping between the API function with the name of API_NF_FTL_ReportExe and the normal function with number 130 is recorded in the column of index number 1. Accordingly, the API function of API_NF_FTL_ReportExe is mapped to a number of normal functions. In addition, the mapping between the API function with the name API_NF_PFTL_Read_SysPage_Retry and the normal function with number 210 is recorded in the column of index number 4. Accordingly, the API function of API_NF_PFTL_Read_SysPage_Retry is mapped to a normal function.

In one embodiment, the second parsing is executed by the parsing module 130 to clarify the calling relationship between the normal functions, and a calling relationship (database 150D) of at least one normal function is developed by the database module 140. The numbers of normal functions are recorded by the calling relationship database of FIG. 2. Each index number represents a calling relationship including the number of the normal function which is called by another normal function and the number of the normal function which is calling another normal function. For example, the column with index number 0 records that normal function number 138 calls normal function number 113, and the column with index number 1 records that normal function number 138 calls normal function number 110, and the column with index number 2 records that normal function number 105 calls normal function number 103. Therefore, normal function number 138 calls two normal functions, and normal function number 105 calls one normal function.

Specifically, when the parsing module 130 determines that one of the API functions is mapped to a normal function, the normal function and the API function with a mapping relationship are obtained from the normal function database 150A and the API function database 150B by the database module 140. Afterwards, the database module 140 marks that the normal function is mapped to the API function in the normal function database 150A, and it records the mapping relationship between the normal function and the API function in the mapping relationship database 150C. In addition, when the parsing module 130 determines that the function which is called by the normal function of the source code 120 is a normal function, the database module 140 records the calling relationship between the normal function and another normal function which is called by the normal function in the calling relationship database 150D.

In addition, when the parsing module 130 determines that the function which is called by the normal function of the source code 230 is a API function, the database module 140 obtains the normal function which is mapped to the called API function through the mapping relationship database 150C, and records the calling relationship between the normal function and the mapped normal function of the API function in the calling relationship database 150D. The memory device 10 and its function management method of the present invention could analyze the mapping relationship between normal functions and API functions, and analyze the calling relationship between the normal functions. Therefore, it will be convenient to manage the memory device 10, and the performance of the memory device 10 could be improved.

Furthermore, the array module 170 develops a two-dimensional array and analyzes the two-dimensional array according to the array target 160. In one embodiment, the array target 160 means to discover the loop which is generated when functions are executed. Therefore, the array module 170 develops the two-dimensional array, and analyzes whether a loop in a calling relationship exists or not from the calling relationship database 150D. Specifically, when one of the at least one normal function calls another normal function, the analysis module 180 utilizes the two-dimensional array to inspect whether or not the name of the called function is identical to the name of the normal function, and inspect whether or not the name of the called function is identical to the names of normal functions which call the normal function. When the name of the called function is identical to the name of the normal function, or when the name of the called function is identical to the names of normal functions which call the normal function, it means that there is a loop in the calling relationship of normal functions. It should be noted that the analysis module 180 compares the names of normal functions, and it does not compare the word strings. Therefore, a high speed for comparison can be obtained to discover the loop efficiently.

Figure 3:
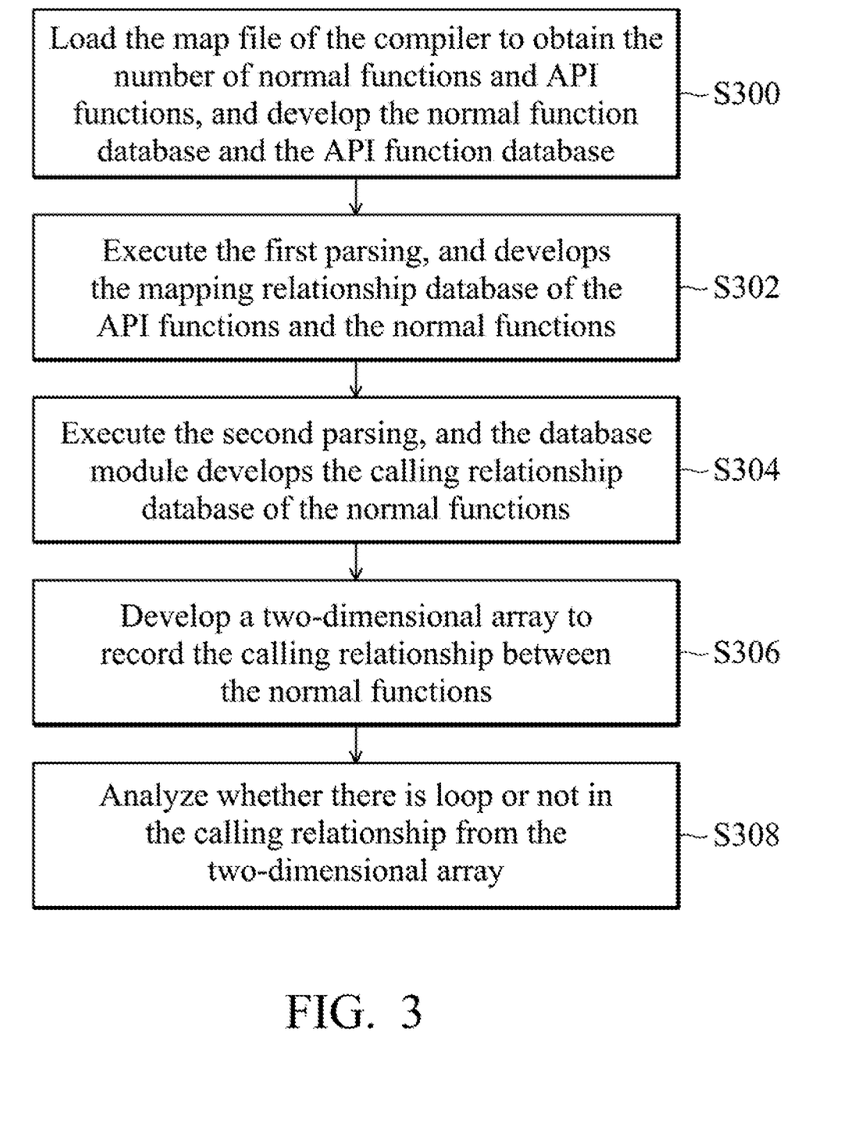
FIG. 3 is a flowchart of a function analysis method according to an embodiment of the invention.

FIG. 3 is a flowchart of a function management method according to an embodiment of the invention. In step S300, the parsing module 130 loads the map file 110 of the compiler to obtain the number of normal functions and API functions, and the database module 140 develops the normal function database 150A and the API function database 150B. In step S302, the parsing module 130 executes the first parsing, and the database module 140 develops the mapping relationship database 150C of the API functions and the normal functions according to the results of the first parsing. Afterwards, in step S304, the parsing module 130 executes the second parsing, and the database module 140 develops the calling relationship database 150D of the normal functions according to the results of the second parsing. It should be noted that the above databases 150A-150D relate to each other and are updated dynamically. When a calling relationship of normal functions is added by the calling relationship database 150D, the value of the calling column or the called column of the normal function will be updated accordingly in the normal function database 150A. Afterwards, in step S306, the array module 170 develops a two-dimensional array to record the calling relationship between the normal functions. Afterwards, step S308 is executed so that the analysis module 180 analyzes whether there is a loop or not in the calling relationship from the two-dimensional array which is developed by the array module 170.

Figure 4:
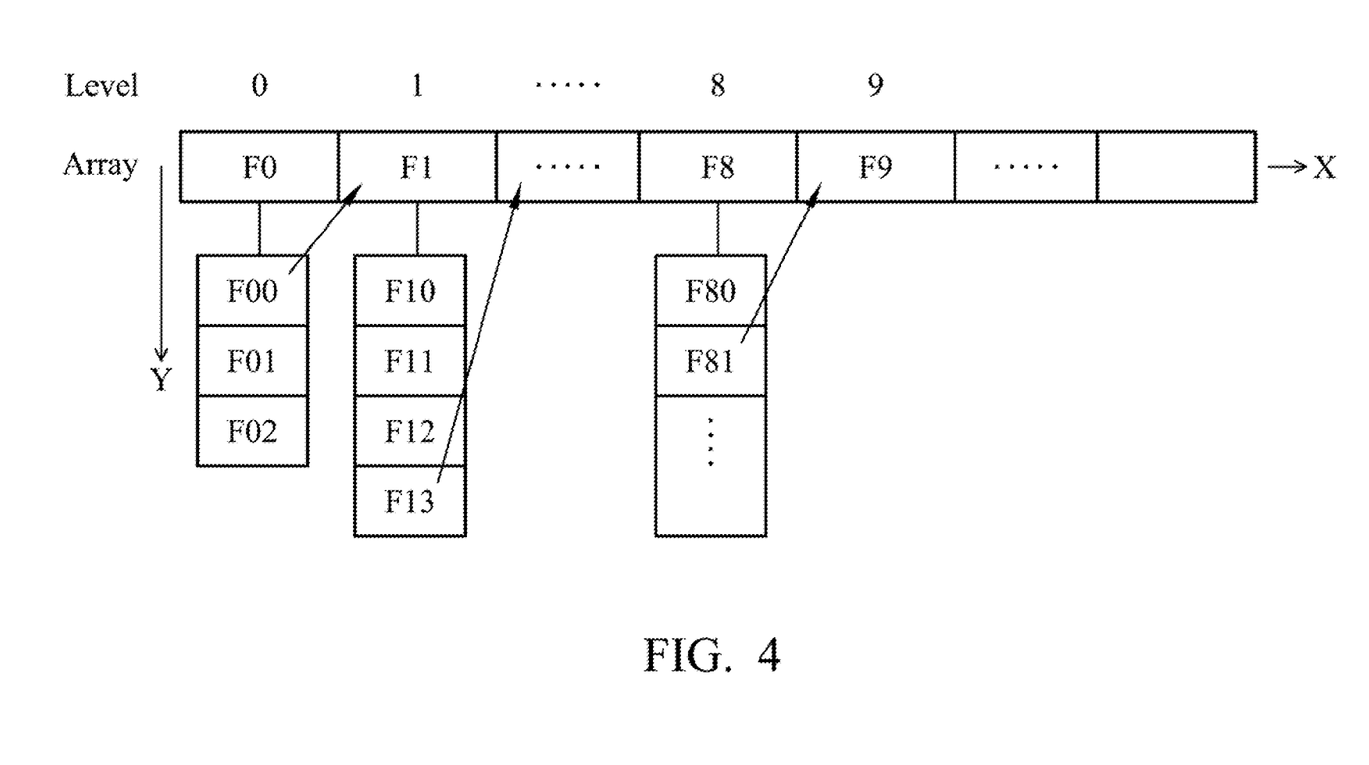
FIG. 4 is a schematic diagram of a two-dimensional array of databases according to an embodiment of the invention.

FIG. 4 is a schematic diagram of a two-dimensional array of databases according to an embodiment of the invention. As shown in FIG. 4, the two-dimensional array includes arrays of two dimensions, which are the X-axis dimension and Y-axis dimension. The first-dimension array (X-axis) of the two-dimensional array is utilized to record the normal function and the called normal function which have a calling relationship. The second-dimension array (Y-axis) of the two-dimensional array is utilized to record all normal functions which can be called by the normal function, and record all normal functions which can be called by the called normal function. Furthermore, the two-dimensional array further records the quantity of all normal functions which can be called by the normal function and the called normal function, and it records the ordinal number of the called normal function among all normal functions which can be called by the normal function.

Specifically, F0, F1, F00, F02, F10 of FIG. 4 are names of normal functions. The level values of F0 function, F1 function, F8 function and F9 function are 0, 1, 8 and 9 respectively. In other words, the F1 function is called the F0 function, the F8 function is called the F1 function through other normal functions, and the F9 function is called the F8 function. Regarding the F0 function, its two-dimensional array records the F00 function, the F01 function and the F02 function which can be called the F0 function. Regarding the F1 function, its two-dimensional array records the F10 function, the F11 function, the F12 function and the F13 function which can be called the F1 function. In addition, the two-dimensional array also records that the F0 function includes three normal functions, F00, F01 and F02. These three normal functions have their own sequential numbers respectively. In one embodiment, the F00 function with the sequential number of 1 is actually called an F0 function. The F00 function is recorded in the column of the F1 function, which indicates that the F00 function is called the F0 function. In one embodiment, the two-dimensional array also records that the F8 function includes a number of normal functions such as F80 and F81. These functions have their own sequential numbers respectively. The F81 function with the sequential number of 2 is actually called an F8 function. The F81 function is recorded in the column of the F9 function. Therefore, due to the data which is accessed by the memory device 10, the content of the two-dimensional array is dynamically changed.

It should be noted that F0, F1, F00, F02 and F10 of FIG. 4 could also be indexes of the normal functions of the tables 150A-150D. When the function of the next level is called, whether there is an identical index in the two-dimensional array or not can be inspected. If there is an identical index, it means that a loop exists. Afterwards, the analysis module 180 transmits the index or the name of the normal function which has a loop to the database module 140, and the database module 140 records the index or the name of the normal function in the loop database 150E. Therefore, by utilizing the two-dimensional array which was developed by the function analysis method of the present invention, a function which may cause a loop can be discovered rapidly. As such, the recording the management can be further performed to prevent the loop from affecting the access speed and performance of the memory device 10.

Figure 5:
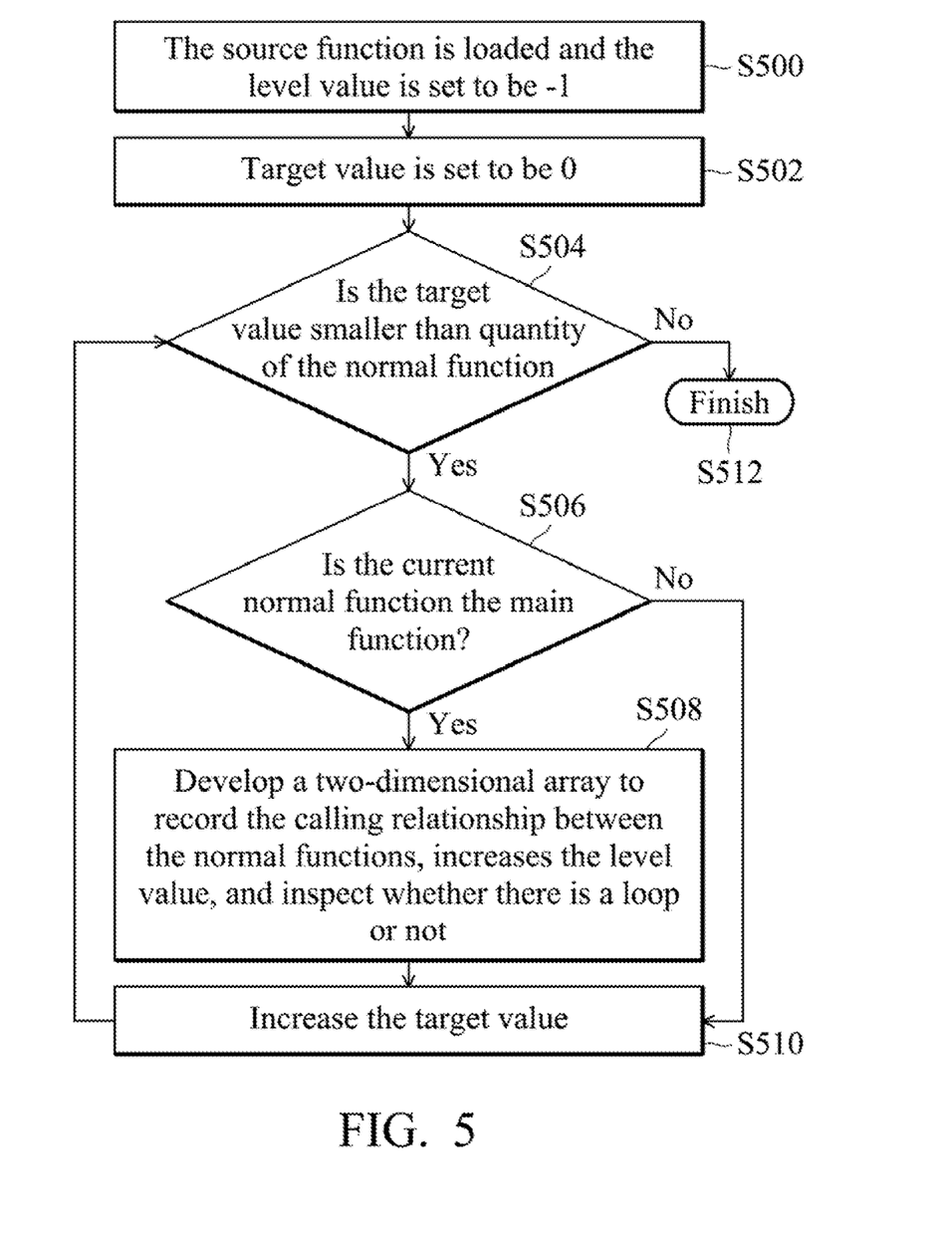
FIG. 5 is a flowchart of a function analysis method according to an embodiment of the invention.

FIG. 5 is a flowchart of a function analysis method according to an embodiment of the invention. The function analysis method of FIG. 5 is executed by the array module 170 and/or the analysis module 180. In step S500, the source function is loaded and the level value is set to −1. For example, the source function is a main function. In step S502, the target value is set to 0. The target value is utilized to indicate the current normal function. Afterwards, step S504 is executed. The analysis module 180 determines whether the target value is smaller than the quantity of the normal function. If the target value is not smaller than the quantity of the normal function, step S512 will be executed to finish the flow. If the target value is smaller than the quantity of the normal function, step S506 will be executed.

In step S506, the analysis module 180 determines whether the current normal function is the main function or not. If the current normal function is not the main function, step S510 will be executed. If the current normal function is the main function, step S508 will be executed. In step S508, the array module 170 develops a two-dimensional array to record the calling relationship between the normal functions, increases the level value, and inspects whether there is a loop or not. Afterwards, step S510 is executed to increase the target value. Afterwards, step S504 is executed.

Figure 6A:
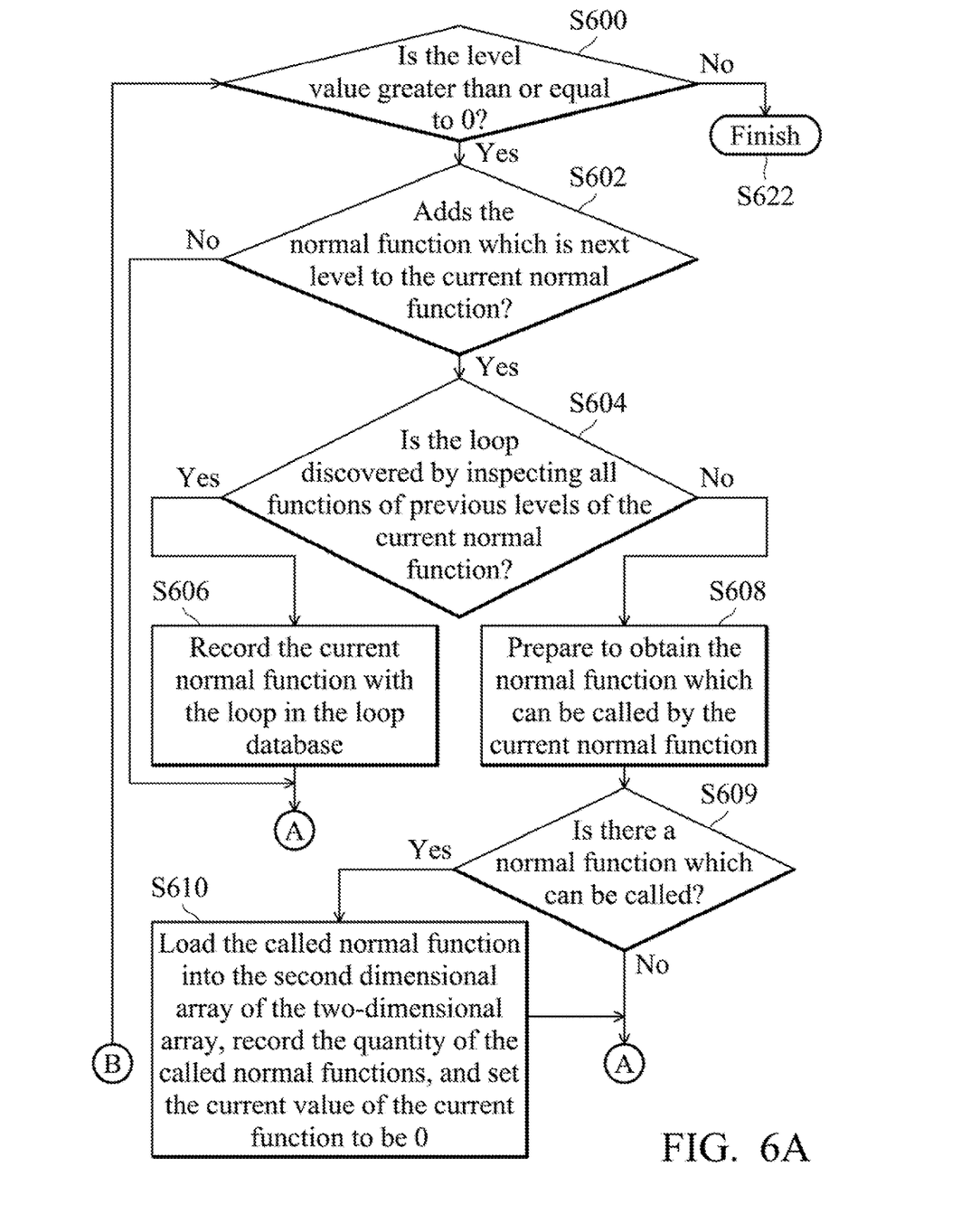
FIG. 6A and FIG. 6B are flowcharts for discovering a loop according to an embodiment of the invention.
Figure 6B:
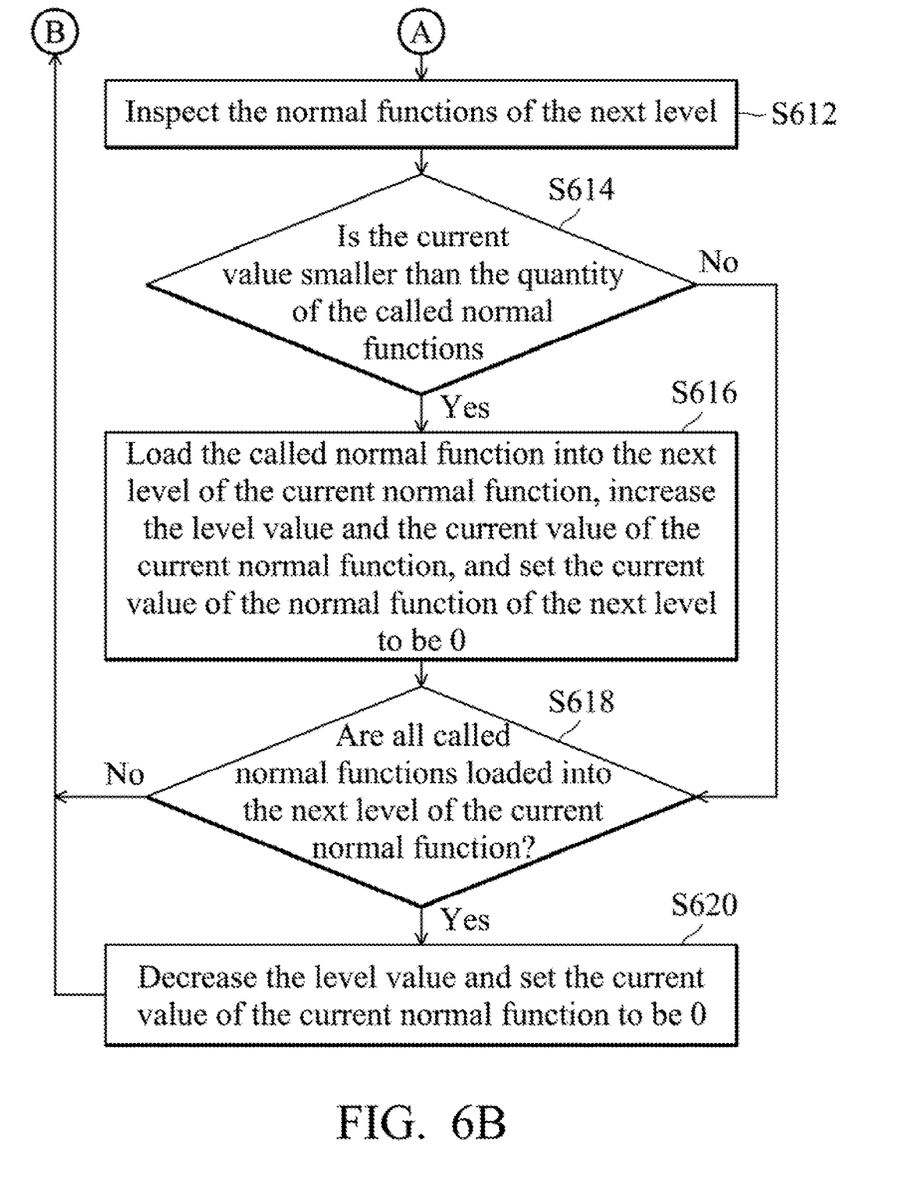

FIG. 6A and FIG. 6B are flowcharts for discovering a loop according to an embodiment of the invention. The function analysis methods of FIG. 6A and FIG. 6B are executed by the array module 170 and/or the analysis module 180. In step S600, whether the level value is greater than or equal to 0 or not is determined. If the level value is not greater than or equal to 0, step S622 will be executed to finish the flow. If the level value is greater than or equal to 0, step S602 will be executed to determine whether or not the normal function which is next level to the current normal function will be added. If the normal function which is next level to the current normal function is not added, step S612 will be executed. If the normal function which is next level to the current normal function is added, step S604 will be executed. In step S604, whether or not the loop is discovered by inspecting all functions of previous levels of the current normal function. If the loop is not discovered by inspecting all functions of previous levels of the current normal function, step S608 will be executed. If the loop is discovered by inspecting all functions of previous levels of the current normal function, step S606 will be executed.

In step S606, the current normal function with the loop is recorded in the loop database 150E. Afterwards, step S612 will be executed. In step S608, the normal function which can be called by the current normal function is prepared to be obtained. Afterwards, step S609 is executed to determine whether or not there is a normal function which can be called. If there is no normal function which can be called, step S612 will be executed. If there is a normal function which can be called, step S610 will be executed to load the called normal function into the second dimensional array of the two-dimensional array, record the quantity of the called normal functions, and set the current value of the current function to 0. Specifically, the current value is utilized to indicate an ordinal number of the normal function which is next level of the current normal function. Afterwards, step S612 is executed to inspect the normal functions of the next level.

Afterwards, step S614 is executed to determine whether the current value is smaller than the quantity of the called normal functions. If the current value is not smaller than the quantity of the called normal functions, step S618 will be executed. If the current value is smaller than the quantity of the called normal functions, step S616 will be executed. In step S616, the called normal function is loaded into the next level of the current normal function in the first dimensional array of the two-dimensional array. The level value and the current value of the current normal function are increased. The current value of the normal function of the next level is set to 0. Afterwards, in step S618, whether or not all called normal functions are loaded into the next level of the current normal function is determined. If all called normal functions are loaded into the next level of the current normal function, step S620 will be executed to decrease the level value and set the current value of the current normal function to 0. If not all called normal functions are loaded into the next level of the current normal function, step S600 will be executed again.

The memory device 10 and its function management method provided by the present invention can record the mapping relationship of normal functions and API functions and analyze the calling relationship of normal functions to inspect the loop. Therefore, the performance of the memory device 10 can be improved. In addition, a two-dimensional array is utilized by the function management of the present invention to simulate the calling of the normal functions and tree-type search. Accordingly, users and research developers can discover loop of calling relationships rapidly and efficiently to prevent the loops from affecting the performance.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A function analysis method for a memory device, comprising:
   analyzing a mapping relationship of at least one application programming interface (API) function and at least one normal function;
   analyzing a calling relationship of the at least one normal function through the mapping relationship;
   developing a two-dimensional array to analyze whether there is a loop or not in the calling relationship, wherein when one normal function of the at least one normal function calls another normal function of the at least one normal function, the name of the called normal function is inspected to determine whether or not it is identical to the name of the normal function and identical to the names of all normal functions which call the normal function.

2. The function analysis method as claimed in claim 1, wherein in the step of developing a two-dimensional array to analyze whether there is a loop or not in the calling relationship, when the name of the called normal function is identical to the name of the normal function, or identical to the names of all normal functions which call the normal function, it is determined that there is a loop in the calling relationship.

3. The function analysis method as claimed in claim 1, wherein a first dimensional array of the two-dimensional array is utilized to record the normal function and the called normal function which have a calling relationship, and a second dimensional array of the two-dimensional array is utilized to record all normal functions which can be called by the normal function, and record all normal functions which can be called by the called normal function, respectively.

4. The function analysis method as claimed in claim 3, wherein the two-dimensional array further records the quantity of all normal functions which can be called by the normal function and the called normal function, and records an ordinal number of the called normal function among all normal functions which can be called by the normal function.

5. The function analysis method as claimed in claim 1, further comprising developing a normal function database of the at least one normal function and an API function database of the at least one API function, wherein the at least one normal function and the at least one API function are obtained through a map file of a compiler.

6. The function analysis method as claimed in claim 5, wherein in the step of analyzing the mapping relationship of at least one API function and at least one normal function, when any API function is mapped to the at least one normal function, obtaining the normal function and the API function which have the mapping relationship from the normal function database and the API function database, marking that the normal function is mapped to the API function in the normal function database, and recording the mapping relationship of the normal function and the API function in a mapping relationship database.

7. The function analysis method as claimed in claim 6, wherein in the step of analyzing the calling relationship of the at least one normal function, when a function which is called by the normal function is a normal function, recording the calling relationship of the normal function and the called normal function in a calling relationship database.

8. The function analysis method as claimed in claim 7, wherein in the step of analyzing calling relationship of the at least one normal function, when a function which is called by the normal function is an API function, obtaining the normal function which is mapped to the called API function, and recording the calling relationship of the normal function and another normal function which is mapped to the API function in the calling relationship database.

9. An electronic device with function analysis, comprising:
   a processor; and
   a memory device, comprising:
      a parsing module, executed by the processor, analyzing the mapping relationship of at least one application programming interface (API) function and at least one normal function, and analyzing the calling relationship of the at least one normal function through the mapping relationship;
      an array module, executed by the processor, developing a two-dimensional array to record the calling relationship; and
      an analysis module, executed by the processor, to analyze whether there is a loop or not in the calling relationship, wherein when one normal function of the at least one normal function calls another normal function of the at least one normal function, name of the called normal function is inspected to determine whether or not it is identical to name of the normal function and identical to names of all normal functions which call the normal function.

10. The electronic device as claimed in claim 9, wherein a first dimensional array of the two-dimensional array is utilized to record the normal function and the called normal function which have the calling relationship, and a second dimensional array of the two-dimensional array is utilized to record all normal functions which can be called by the normal function, and record all normal functions which can be called by the called normal function.

11. The electronic device as claimed in claim 9, wherein the two-dimensional array further records the quantity of all normal functions which can be called by the normal function and the called normal function, and records an ordinal number of the called normal function among all normal functions which can be called by the normal function.

12. The electronic device as claimed in claim 9, further comprising a database module developing a normal function database of the at least one normal function and an API function database of the at least one API function, wherein when the parsing module determines that any one of the at least one API function is mapped to the at least one normal function, the database module records the mapping relationship of the normal function and the API function in a mapping relationship database.

13. The electronic device as claimed in claim 12, wherein when the parsing module determines that a function which is called by the normal function is a normal function, the database module records the calling relationship of the normal function and the called normal function in a calling relationship database, and when the parsing module determines that a function which is called by the normal function is an API function, the database module obtains the normal function which is mapped to the called API function, and records the calling relationship of the normal function and another normal function which is mapped to the API function in the calling relationship database.

\* \* \* \* \*